US012247435B2

(12) United States Patent
Roberts

(10) Patent No.: US 12,247,435 B2
(45) Date of Patent: Mar. 11, 2025

(54) FIREPROOF SAFE COVER

(71) Applicant: Richard Roberts, Pennington, AL (US)

(72) Inventor: Richard Roberts, Pennington, AL (US)

( * ) Notice: Subject to any disclaimer, the term of this patent is extended or adjusted under 35 U.S.C. 154(b) by 159 days.

(21) Appl. No.: 18/338,607

(22) Filed: Jun. 21, 2023

(65) Prior Publication Data

US 2024/0254825 A1 Aug. 1, 2024

Related U.S. Application Data

(60) Provisional application No. 63/442,558, filed on Feb. 1, 2023.

(51) Int. Cl.
*E05G 1/02* (2006.01)

(52) U.S. Cl.
CPC .................................... *E05G 1/02* (2013.01)

(58) Field of Classification Search
CPC ........... F41C 33/06; F41B 5/1457; E05G 1/02
USPC ........................................... 109/24, 49.5, 26
See application file for complete search history.

(56) References Cited

U.S. PATENT DOCUMENTS 2,875,600 A 6/1860 Jenkins
1,279,209 A 9/1918 Wupper
3,648,613 A * 3/1972 Cunn ........................ F42D 5/05 102/303
4,048,926 A 9/1977 Brush
4,856,436 A * 8/1989 Campbell ............ E04H 1/1238 109/38
6,863,100 B2 * 3/2005 Neal .................. A47J 37/0786 D6/610
9,468,337 B2 * 10/2016 Simon ................ A47J 37/0786
10,458,741 B1 10/2019 Fischer
2012/0266628 A1 * 10/2012 Kieling ................. A45C 11/20 62/457.2
2017/0160052 A1 6/2017 Brown

FOREIGN PATENT DOCUMENTS

CA 2438802 A1 * 2/2005 ............... E04H 9/04

* cited by examiner

*Primary Examiner* — Suzanne L Barrett
(74) *Attorney, Agent, or Firm* — Brennan, Manna & Diamond, LLC

(57) ABSTRACT

A fireproof safe cover designed to provide protection against fire, excessive heat, and smoke for safes such as gun safes used for storing valuable items. The cover includes a rear wall, side walls, a top surface, and a zippered front surface and can be slipped directly over a safe in a closed orientation with front surface zippered/fastened. The zippers mounted along opposing edges of the front surface can be unfastened for easy access of the safe in an open orientation. The cover is available in different sizes and colors and is made of fire-resistant material to safeguard the safe and its contents. The rear wall of the cover has openings for electrical wiring, and the cover can be personalized with embroidered logos or indicia. In some embodiments, the cover has recessed, reinforced, and/or pass-through areas for easy access of the safe and to accommodate protrusions of the safe.

20 Claims, 7 Drawing Sheets

FIREPROOF SAFE COVER

CROSS-REFERENCE TO RELATED APPLICATION

The present application claims priority to, and the benefit of, U.S. Provisional Application No. 63/442,558, which was filed on Feb. 1, 2023 and is incorporated herein by reference in its entirety.

FIELD OF THE INVENTION

The present invention generally relates to the field of safe covers. More specifically, the present invention relates to a novel fireproof safe cover designed to offer additional protection against excessive heat and water. The cover is made of fireproof material and features a zippered front surface to maintain quick and easy access to the safe without removing the cover. The cover prevents severe damage to the safe and its contents during a house fire, office fire, or other emergency situations. Accordingly, the present disclosure makes specific reference thereto. Nonetheless, it is to be appreciated that aspects of the present invention are also equally applicable to other like applications, devices, and methods of manufacture.

BACKGROUND

By way of background, safes, including gun safes, are specifically designed to safely store important documents, valuables, and firearms while preventing unauthorized access. Safes are commonly used in homes and business areas to provide a level of protection for these items. However, even when stored in a safe, there is still a risk of damage to the stored items during a fire and excessive temperature. More specifically, fire poses a significant threat to the items stored in safes. While the safe itself may offer some level of fire resistance, conventional safes are not sufficient to fully protect the contents therein from destruction. As a result, individuals may face the need to replace important and expensive items that have been damaged or destroyed in a fire, despite being stored in a safe. This causes a financial burden on individuals and requires a lot of effort and time to replace such items.

With gun safes, there is an additional concern related to ammunition. When exposed to high temperatures, ammunition stored in gun safes can explode, posing a serious safety hazard during a fire. This further emphasizes the need for effective fire protection measures for gun safes. Conventional safes, although providing a degree of protection against burglary or unauthorized access, often fail to withstand the extreme environmental conditions of a real fire. The intense heat and flames generated during a fire can compromise the integrity of the safe, enabling heat and smoke to penetrate the interior and damage the contents stored therein. Individuals desire ways of improving fire resistance capabilities of safes to prevent damage caused due to fire and excessive heat.

Therefore, there exists a long felt need in the art for a fireproof accessory such as a fireproof cover for safes. There is also a long felt need in the art for a fireproof cover for safes that provides enhanced protection against high temperatures, flames, and smoke. Additionally, there is a long felt need in the art for a fireproof gun safe cover that can cover a safe to protect the safe from fire and excessive temperature. Moreover, there is a long felt need in the art for a fireproof gun safe cover that prevents ammunition stored in a gun safe from being exposed to fire, flames, and high temperatures. Further, there is a long felt need in the art for fireproof covers that cover safes for significantly reducing the risk of damage to firearms, important documents, and other valuables stored in the safes during a fire. Finally, there is a long felt need in the art for a fireproof gun safe cover that prevents severe damage to the safe and its contents during a house fire, office fire, or other emergency conditions.

The subject matter disclosed and claimed herein, in one embodiment thereof, comprises a fireproof safe cover for covering a safe such as a gun safe to protect against fire, excessive heat, and smoke. The fireproof safe cover features a rear wall, a pair of side walls, a top surface, a zippered front surface, a pair of zippers along the edges of the zippered front surface, wherein the front surface is sewn along the top edge thereof and is configured to be unfastened using the zippers to function as a flap for accessing the door of the gun safe. The cover having a plurality of openings for enabling electrical wiring to pass through the cover to connect to the gun safe and can include one or more recessed and reinforced areas for supporting the cover and enabling users to access the safe.

In this manner, the fireproof safe cover of the present invention accomplishes all of the forgoing objectives and provides individuals with a fireproof cover for safes such as gun safes. The cover is directly slipped over a safe to cover the safe and is made of fire-resistant materials to provide enhanced protection against high temperatures, flames, and smoke. The cover allows authorized access of the safe while maintaining protection against excessive heat, fire, and other emergencies.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a fireproof safe cover for protecting a safe such as a gun safe against fire, excessive heat, and smoke. The fireproof safe cover further comprising a generally cuboidal configuration including a rear wall, a pair of side walls, a top surface, a zippered front surface, and a pair of zippers along the edges of the zippered front surface, wherein the front surface is sewn along the top edge thereof and is configured to be unfastened using the zippers to function as a flap for accessing the door of the gun safe, the cover being flexible and capable of being slipped directly over the gun safe, the rear wall having a plurality of openings for enabling electrical wiring to pass through the cover to connect to the gun safe, and one or more personalized logo, indicia, or embroidery on one or more walls and surfaces of the cover for personalization.

In yet another embodiment, each zipper has a zipper tab, wherein each zipper tab is designed to be pulled towards an open bottom of the cover to fasten the zippered front surface, thereby completely covering the gun safe enclosed by the cover.

In a further embodiment, the cover includes a layer of one of fiberglass, Kevlar, or other heat-resistant synthetic fibers and another layer of an insulating material for providing additional heat resistance.

In a further embodiment, a fireproof cover for protecting a gun safe from fire, excessive temperature, and other emergencies is disclosed. The fireproof cover includes a flexible cover with a closed orientation, the cover having a rear wall, a pair of side walls, a top surface, and a zippered front surface with zippers for fastening, the cover being directly slippable over the gun safe with an open bottom accommodating the gun safe, the cover being aligned with the top surface of the gun safe and gradually lowered to drape down the walls of the gun safe, wherein in an installed orientation covering the gun safe, the rear wall of the cover conforming to the rear wall of the gun safe, the side walls conforming to the side walls of the gun safe, the top surface conforming to the top surface of the gun safe, and the zippered front surface covering the door of the gun safe.

In a further embodiment, the fireproof safe cover includes one or more recessed areas designed to accommodate various features and protrusions of the safe, one or more reinforced areas positioned and designed to align with the protrusions of the safe, wherein the front surface can remain in place while the user accesses the features and protrusions of the safe through the recessed areas and reinforced areas.

Numerous benefits and advantages of this invention will become apparent to those skilled in the art to which it pertains upon reading and understanding of the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1:
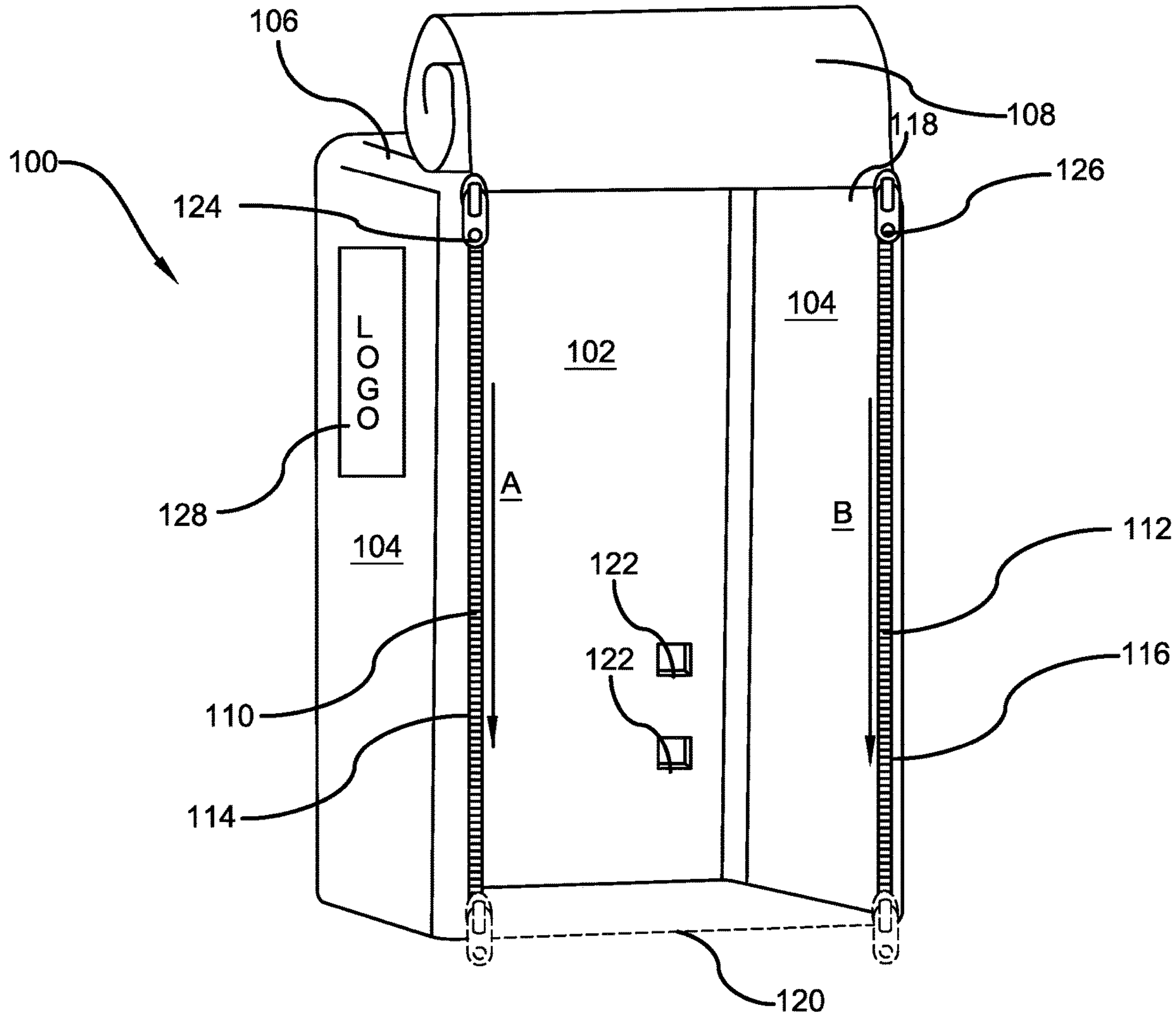
FIG. 1 illustrates a perspective view of one potential embodiment of a fireproof gun safe cover of the present invention in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long felt need in the art for a fireproof accessory such as a fireproof cover for safes. There is also a long felt need in the art for a fireproof cover for safes that provides enhanced protection against high temperatures, flames, and smoke. Additionally, there is a long felt need in the art for a fireproof gun safe cover that can cover a safe to protect the safe from fire and excessive temperature. Moreover, there is a long felt need in the art for a fireproof gun safe cover that prevents ammunition stored in a gun safe from being exposed to fire, flames, and high temperatures. Further, there is a long felt need in the art for fireproof covers that cover safes for significantly reducing the risk of damage to firearms, important documents, and other valuables stored in the safes during a fire. Finally, there is a long felt need in the art for a fireproof gun safe cover that prevents severe damage to the safe and its contents during a house fire, office fire, or other emergency conditions.

The present invention, in one exemplary embodiment, is a fireproof cover for protecting a gun safe and items stored therein from fire, excessive temperature, and other emergencies. The fireproof cover having a rear wall, a pair of side walls, a top surface, and a zippered front surface with zippers for fastening, the cover being directly slippable over the gun safe with an open bottom accommodating the gun safe, the cover being aligned with the top surface of the gun safe and gradually lowered to drape down the walls of the gun safe, wherein in an installed orientation covering the gun safe, the rear wall of the cover conforming to the rear wall of the gun safe, the side walls conforming to the side walls of the gun safe, the top surface conforming to the top surface of the gun safe, and the zippered front surface covering the door of the gun safe.

Figure 2A:
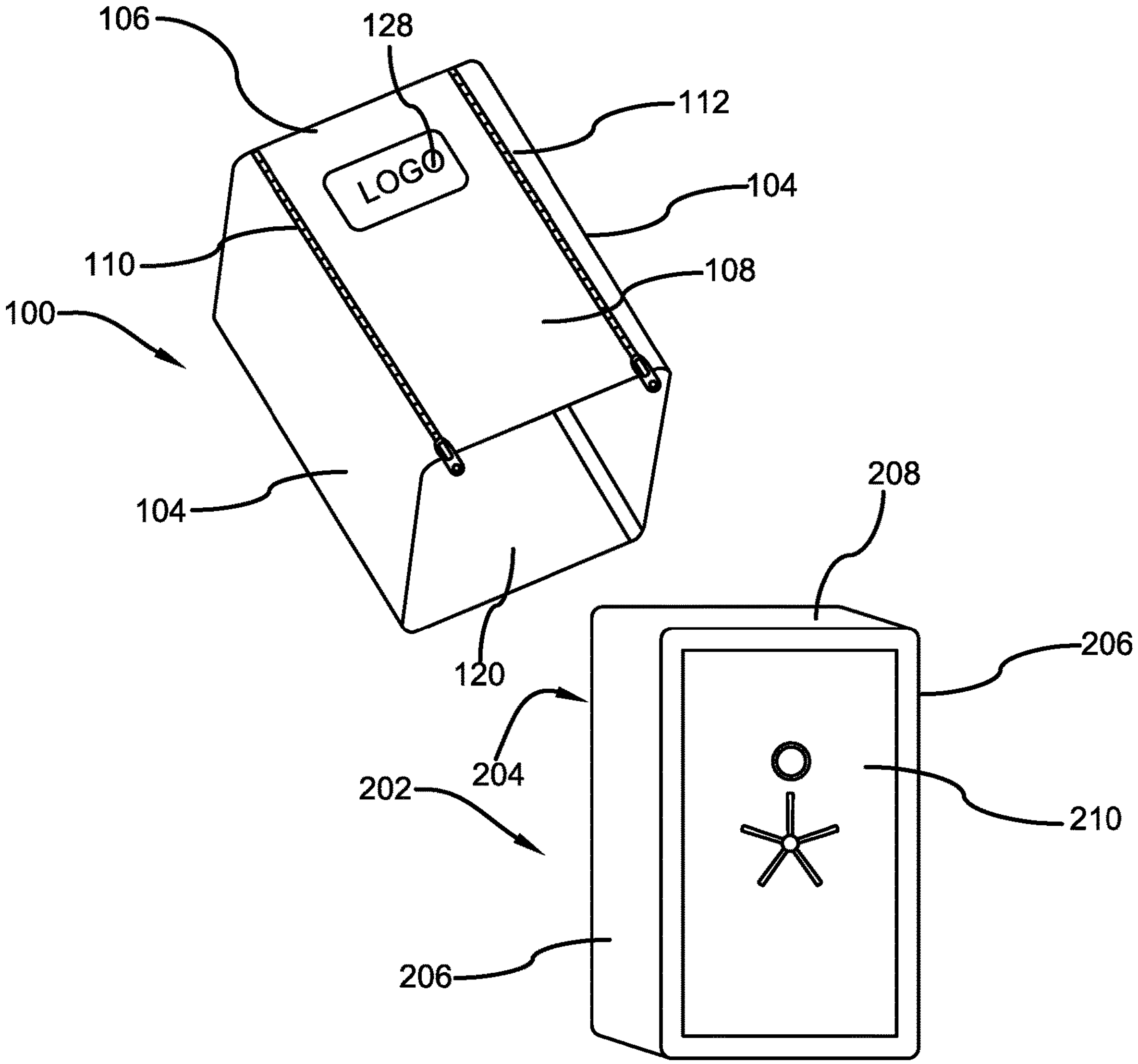
FIG. 2A illustrates a perspective view showing the fireproof gun safe cover being directly slipped over a gun safe in accordance with the disclosed architecture.

Referring initially to the drawings, FIG. 1 illustrates a perspective view of one potential embodiment of fireproof gun safe cover of the present invention in accordance with the disclosed architecture. The fireproof safe cover 100 of the present invention is designed as a safe cover for offering additional protection against fire, excessive heat, and smoke. More specifically, the safe cover 100 is generally cuboidal and includes a rear wall 102, a pair of side walls 104, a top surface 106 and a zippered front surface 108. The gun safe cover 100 is flexible and can be slipped directly over a gun safe as illustrated in FIG. 2A. The cover 100 has a one-piece construction and includes a pair of zippers 110, 112 along the edges 114, 116 of the front surface 108, respectively. The zippered front surface 108 is sewn along the top edge 118 thereof and can be unfastened using the zippers 110, 112, thereby using as a flap enabling a user to access door of a gun safe. The fastened orientation of the front surface 108 is shown in dashed lines in FIG. 1.

The gun safe cover 100 is designed in different sizes and colors for covering gun safes of different dimensions and variations. The cover 100 has an open bottom 120, thereby creating a cavity formed by the walls 102, 104, 106, 108 for accommodating a gun safe. Further, cover 100 is made of fire-resistant material to protect a safe and item stored therein from fire, water, excessive heat, and other emergencies. The rear wall 102 of the gun safe cover 100 has a plurality of openings 122 for enabling electrical wiring to pass through the cover 100 to connect to the gun safe.

Figure 5:
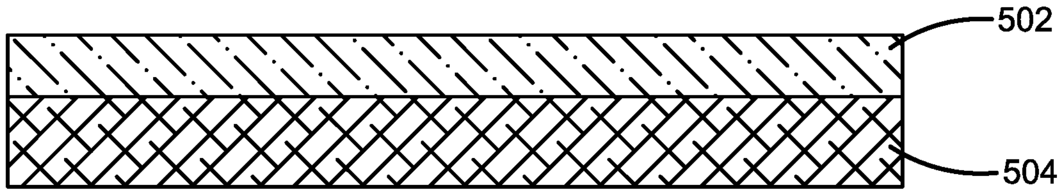
FIG. 5 illustrates a cross-sectional diagram displaying the insulation layer of the fireproof safe cover of the present invention in accordance with the disclosed architecture.

The zipper tabs 124, 126 are pulled towards the open bottom 120 (shown through arrows A and B respectively) of the cover 100 to fasten the front surface 108 to completely cover a safe. The safe cover 100 can have personalized logo, indicia or embroidery 128 on one or more walls and surfaces for creating a personalization in the safe cover 100. In the preferred embodiment, the fireproof safe cover 100 can be manufactured from one or more fiberglass, Kevlar, or other heat-resistant synthetic fibers. Furthermore, an insulation layer is incorporated into the cover 100 (as illustrated in FIG. 5) as a coating for providing additional heat resistance.

FIG. 2A illustrates a perspective view showing the fireproof gun safe cover being directly slipped over a gun safe in accordance with the disclosed architecture. For protecting a gun safe 202 from fire, excessive temperature and other emergencies, the cover 100 in a closed orientation with the front surface 108 fastened using the zippers 110, 112 is directly slipped over the gun safe 202 with the open bottom 120 accommodating the gun safe 202. The cover 100 is aligned with the top surface 208 of the safe 202 and the cover 100 is slowly lowered to drape down the walls of the safe 202.

Figure 2B:
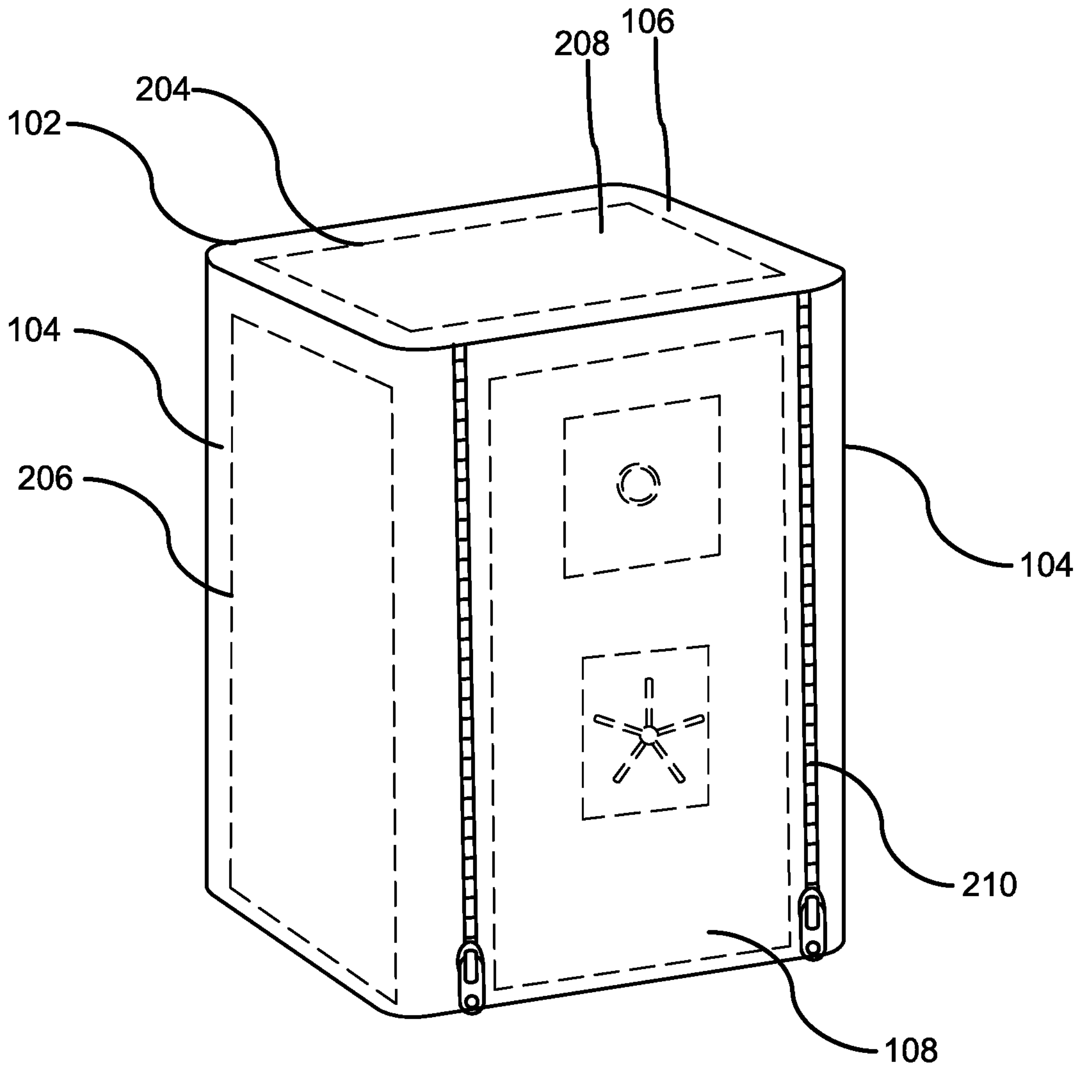
FIG. 2B illustrates a perspective view of the gun safe covered with the fireproof gun safe cover in accordance with the disclosed architecture.
Figure 6:
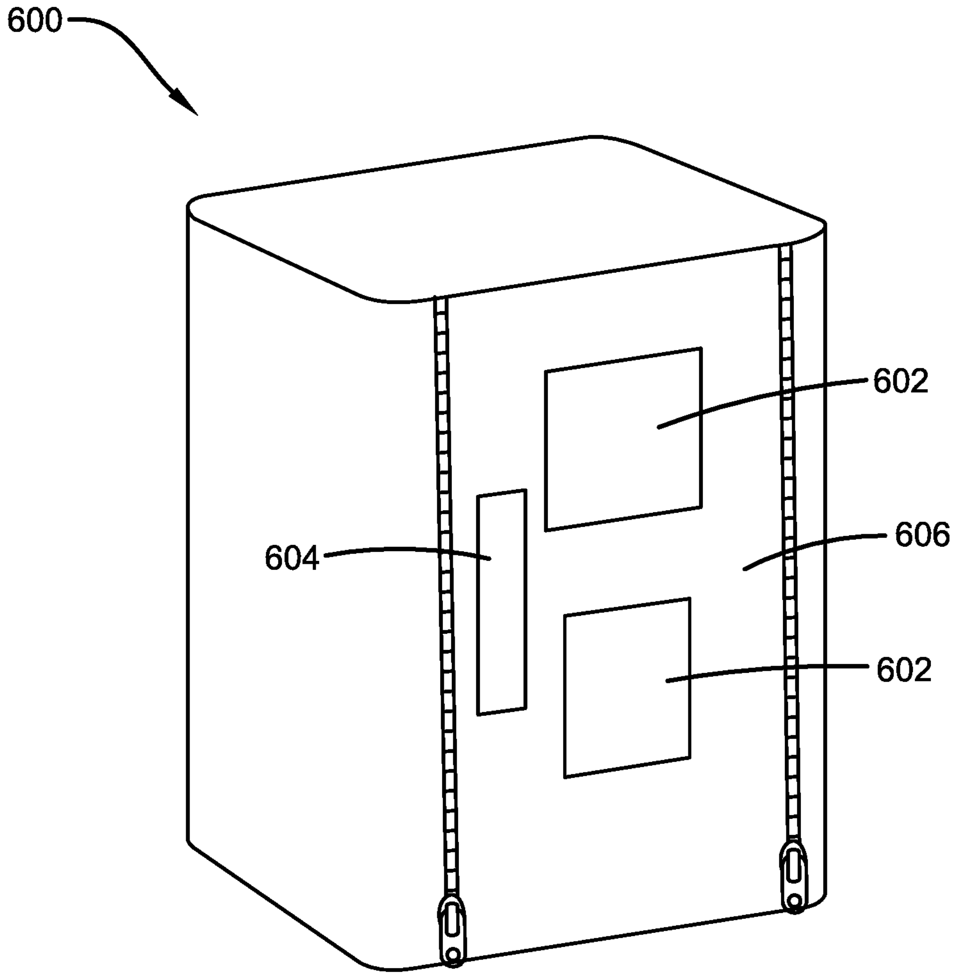
FIG. 6 illustrates another embodiment of the fireproof safe cover of the present invention having recessed areas and reinforced areas in accordance with the disclosed architecture.

The cover 100 is oriented such that in installed orientation covering the safe 202 as illustrated in FIG. 2B, the rear wall 102 of the cover 100 conforms to the rear wall 204 of the gun safe 202, the side walls 104 conforms to side walls 206 of the safe 202, the top surface 106 conforms to the top surface 208 of the safe 202 and zipper front surface 108 covers the door 210 of the safe 202. The cover 100 can be easily installed and the front surface 108 allows easy access of the safe 202 without removing the cover 100. In some embodiments, the front surface 108 has a plurality of recesses, openings, or pass-throughs for accommodating various features and protrusions of the gun safe 202 as illustrated in FIG. 6.

Figure 3:
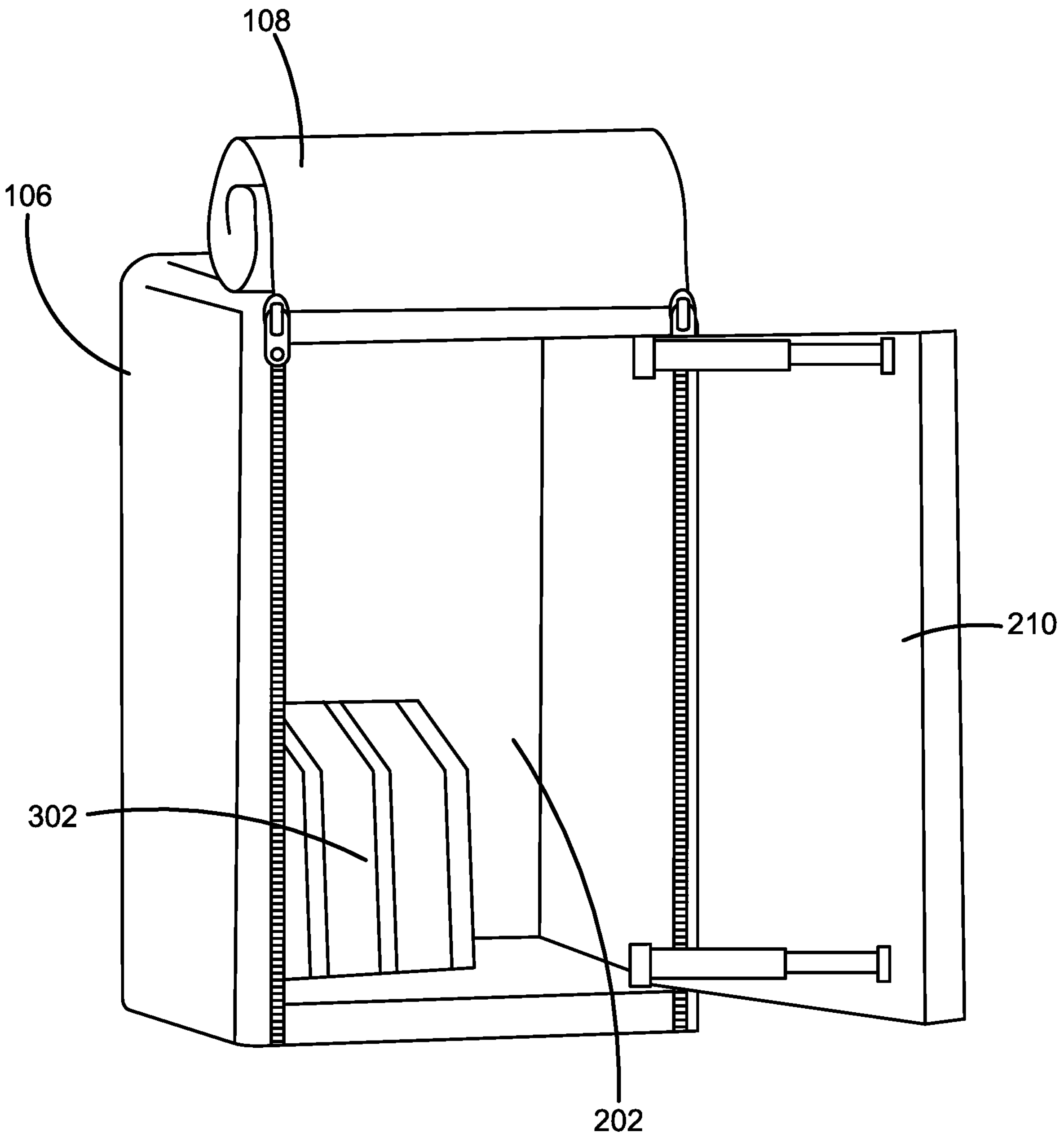
FIG. 3 illustrates a perspective view showing access of the gun safe while the safe is covered in the fireproof gun safe cover of the present invention in accordance with the disclosed architecture.

FIG. 3 illustrates a perspective view showing access of the gun safe while the safe is covered in the fireproof gun safe cover of the present invention in accordance with the disclosed architecture. For storing items or accessing items 302 stored inside the gun safe 202, the front surface 108 is unfastened and is rolled upwards to place on top surface 106 of the cover 100. The door 210 of the safe 202 can be opened and items 302 can be stored or can be accessed. The cover 100 does not obstruct operation and access of the gun safe 202 while protecting the safe 202 from fire, heat, and other emergencies. After use, the front surface 108 can be fastened to completely enclose the safe 202 inside the cover 100.

Figure 4:
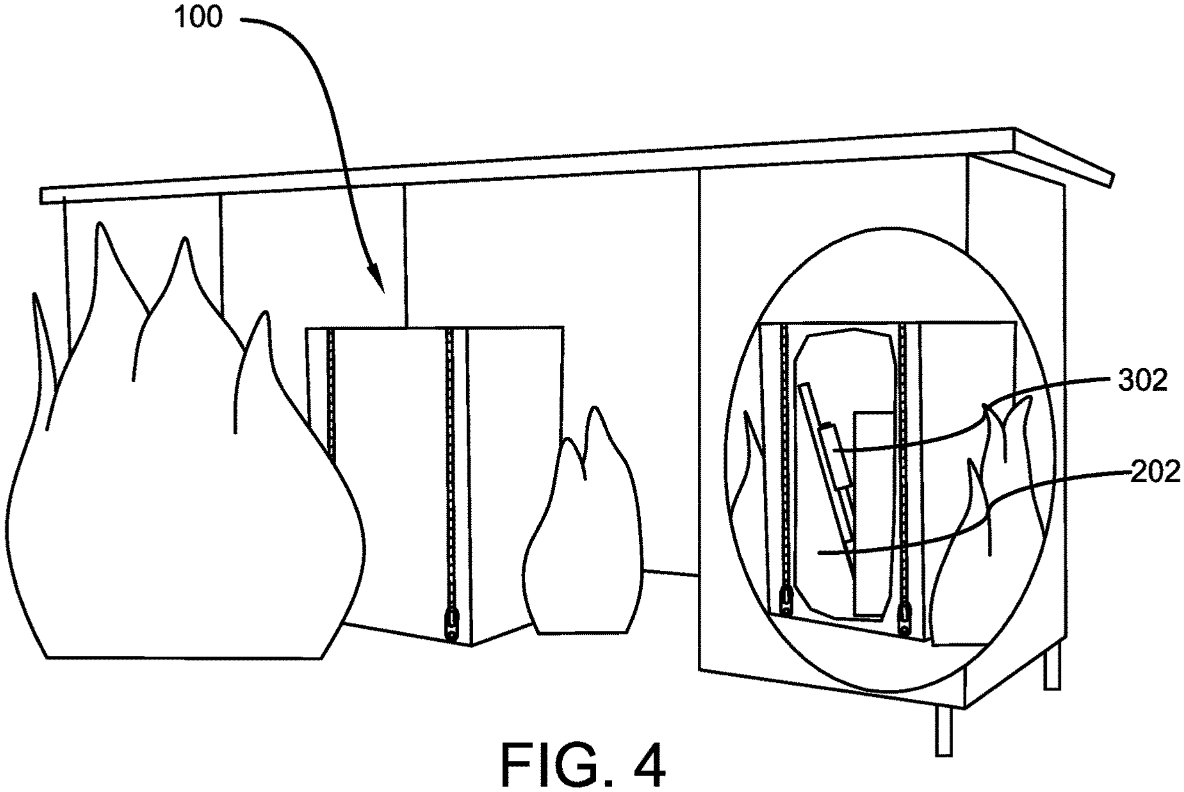
FIG. 4 illustrates a perspective view showing the gun safe covered with the fireproof gun safe cover being protected from fire in accordance with the disclosed architecture.

FIG. 4 illustrates a perspective view showing the gun safe covered with fireproof gun safe cover being protected from fire in accordance with the disclosed architecture. The cover 100 can be easily installed to cover the gun safe 202 such that the gun safe 202 remains protected from fire 402, excessive heat, and other severe environmental elements. As illustrated, the items 302 stored inside the safe 202 remain at a normal temperature and are protected from explosion. Further, the cover 100 does not catch fire and remains at a substantially lower temperature than flames 402 enabling users to easily maneuver the safe 202 with the cover 100 installed thereon.

FIG. 5 illustrates a cross-sectional diagram displaying the insulation layer of the fireproof safe cover of the present invention in accordance with the disclosed architecture. In one embodiment of the present invention, the cover 100 includes a bottom layer 502 made of heat-resistant fiber and the bottom layer 502 has a thickness in the range of 0.50"-1.25" depending on design and material used. For providing additional insulation, the insulation layer 504 is positioned as a coating on the bottom layer 502. The insulation layer 504 can have a thickness in the range of 0.20"-0.75" in different embodiments.

FIG. 6 illustrates another embodiment of the fireproof safe cover of the present invention having recessed areas and reinforced areas in accordance with the disclosed architecture. In the present embodiment, the safe cover 600 includes one or more recessed areas 602 and one or more reinforced areas 604 for accommodating the various features and protrusions such as handle, lock and more of the safe/gun safe. The areas 602, 604 are positioned and designed to align with the protrusions and enabling a user to operate the safe without requiring removal of the front surface 606 of the safe cover 600.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "fireproof safe cover", "fireproof gun safe cover", "gun safe cover", safe cover", and "cover" are interchangeable and refer to the fireproof safe cover 100, 600 of the present invention.

Notwithstanding the forgoing, the fireproof safe cover 100, 600 of the present invention can be of any suitable size and configuration as is known in the art without affecting the overall concept of the invention, provided that it accomplishes the above stated objectives. One of ordinary skill in the art will appreciate that the fireproof safe cover 100, 600 as shown in the FIGS. are for illustrative purposes only, and that many other sizes and shapes of the fireproof safe cover 100, 600 are well within the scope of the present disclosure. Although the dimensions of the fireproof safe cover 100, 600 are important design parameters for user convenience, the fireproof safe cover 100, 600 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A fireproof safe cover device comprising:

a fireproof safe cover having a flexible cuboidal configuration including a rear wall, a pair of side walls, a top surface, a front surface, and an open bottom to form a cavity therein;

wherein said fireproof safe cover having a one-piece construction for slipping over a safe;

wherein said front surface having a left edge zipper and a right edge zipper;

wherein said front surface and said top surface having a common front edge for hingedly folding said front surface over said top surface when said left edge zipper and said right edge zipper are unzipped;

wherein the unzipped said left edge zipper and said right edge zipper enabling access to a front door of the safe; and further wherein said fireproof safe cover having a fire-resistant material layer.

2. The fireproof safe cover device of claim 1, wherein said rear wall having at least one opening for passing an electrical wire therethrough.

3. The fireproof safe cover device of claim 2, wherein said fire-resistant material layer selected from a group consisting of a fiberglass, a Kevlar, and a heat-resistant synthetic fiber.

4. The fireproof safe cover device of claim 3, wherein said fireproof safe cover having an insulation layer.

5. The fireproof safe cover device of claim 4, wherein said top surface resting on a top surface area of the safe when said fireproof safe cover is in the installed orientation.

6. The fireproof safe cover device of claim 5, wherein said fireproof safe cover in the installed orientation covering the safe including a rear wall, a top wall, a first side wall, a second side wall, a front wall, and the front door of the safe.

7. The fireproof safe cover device of claim 6, wherein said front surface having a plurality of pass-throughs for access to the front door of the safe.

8. The fireproof safe cover device of claim 6, wherein said front surface rollable upward to provide access to the entire front door of the safe.

9. The fireproof safe cover deice of claim 6, wherein said fire-resistant material layer having a thickness from 0.50 inches to 1.25 inches, and further wherein said insulation layer having a thickness from 0.20 inches to 0.75 inches.

10. A fireproof safe cover device comprising:

a fireproof safe cover having a flexible cuboidal configuration including a rear wall, a pair of side walls, a top surface, a front surface, and an open bottom to form a cavity therein;

wherein said fireproof safe cover having a one-piece construction for slipping over a safe;

wherein said front surface having a left edge zipper and a right edge zipper;

wherein said front surface and said top surface having a common front edge for hingedly folding said front surface over said top surface when said left edge zipper and said right edge zipper are unzipped;

wherein the unzipped said left edge zipper and said right edge zipper enabling access to a front door of the safe;

wherein said fireproof safe cover having a fire-resistant material layer;

wherein said fireproof safe cover having an insulation layer;

wherein said fire-resistant material layer having a thickness from 0.50 inches to 1.25 inches; and further wherein said insulation layer having a thickness from 0.20 inches to 0.75 inches.

11. The fireproof safe cover device of claim 10, wherein said rear wall having at least one opening for passing an electrical wire therethrough.

12. The fireproof safe cover device of claim 11, wherein said fire-resistant material layer selected from a group consisting of a fiberglass, a Kevlar, and a heat-resistant synthetic fiber.

13. The fireproof safe cover device of claim 12, wherein said top surface resting on a top surface area of the safe when said fireproof safe cover is in the installed orientation.

14. The fireproof safe cover device of claim 13, wherein said fireproof safe cover in the installed orientation covering the safe including a rear wall, a top wall, a first side wall, a second side wall, a front wall, and the front door of the safe.

15. The fireproof safe cover device of claim 14, wherein said front surface having a plurality of pass-throughs for access to the front door of the safe.

16. The fireproof safe cover device of claim 15, wherein said front surface rollable upward to provide access to the entire front door of the safe.

17. A fireproof safe cover device comprising:

a fireproof safe cover having a flexible cuboidal configuration including a rear wall, a pair of side walls, a top surface, a front surface, and an open bottom to form a cavity therein;

wherein said fireproof safe cover having a one-piece construction for slipping over a safe;

wherein said front surface having a left edge zipper and a right edge zipper;

wherein said front surface and said top surface having a common front edge for hingedly folding said front surface over said top surface when said left edge zipper and said right edge zipper are unzipped;

wherein the unzipped said left edge zipper and said right edge zipper enabling access to a front door of the safe;

wherein said fireproof safe cover having a fire-resistant material layer;

wherein said rear wall having at least one opening for passing an electrical wire therethrough;

wherein said fire-resistant material layer selected from a group consisting of a fiberglass, a Kevlar, and a heat-resistant synthetic fiber;

wherein said fireproof safe cover having an insulation layer;

wherein said front surface having a plurality of pass-throughs for access to the front door of the safe; and further wherein said front surface rollable upward to provide access to the entire front door of the safe.

18. The fireproof safe cover device of claim 17, wherein said top surface resting on a top surface area of the safe when said fireproof safe cover is in the installed orientation.

19. The fireproof safe cover device of claim 18, wherein said fireproof safe cover in the installed orientation covering the safe including a rear wall, a top wall, a first side wall, a second side wall, a front wall, and the front door of the safe.

20. The fireproof safe cover device of claim 19, wherein said fire-resistant material layer having a thickness from 0.50 inches to 1.25 inches, and further wherein said insulation layer having a thickness from 0.20 inches to 0.75 inches.

* * * * *